United States Patent [19]
Windgasen

[11] 3,869,272
[45] Mar. 4, 1975

[54] MANGANESE MICRONUTRIENT

[75] Inventor: Richard J. Windgasen, East Chicago, Ill.

[73] Assignee: Standard Oil Company, Chicago, Ill.

[22] Filed: Sept. 19, 1973

[21] Appl. No.: 398,656

Related U.S. Application Data

[63] Continuation of Ser. No. 222,374, Jan. 31, 1972, abandoned.

[52] U.S. Cl. .................................. 71/1, 71/64 C
[51] Int. Cl. ..................... C05f 11/00, C05d 9/02
[58] Field of Search ............................. 71/1, 64 C

[56] References Cited
UNITED STATES PATENTS

| | | | |
|---|---|---|---|
| 2,950,183 | 8/1960 | Nikitkin | 71/1 X |
| 2,976,138 | 3/1961 | Hesten | 71/1 |
| 3,131,048 | 4/1964 | Bulassa | 71/1 |
| 3,244,500 | 5/1966 | Stinson | 71/1 |
| 3,667,928 | 6/1972 | Backlund | 71/64 C |

OTHER PUBLICATIONS

Condensed Chemical Dictionary, 8th Ed., Von Nostrand, Reingold Co., 5–26–71, pp. 795–796.

*Primary Examiner*—Samih N. Zaharna
*Assistant Examiner*—Richard Barnes
*Attorney, Agent, or Firm*—Edwin C. Lehner; Arthur G. Gilkes; William T. McClain

[57] ABSTRACT

Aqueous ammoniacal solutions of divalent manganese, citric acid, and anti-oxidant provide soluble manganese in liquid fertilizers.

5 Claims, No Drawings

MANGANESE MICRONUTRIENT

This is a continuation of application Ser. No. 222,374 filed Jan. 31, 1972 and now abandoned

BACKGROUND OF THE INVENTION

1. Field of the Invention

This invention relates to liquid plant nutrients. More particularly, it relates to aqueous ammoniacal solutions of divalent manganese, citric acid, and an anti-oxidant, their preparation and use for plant nutrient purposes.

2. Description of the Prior Art

Manganese is an essential element in plant nutrition, and a deficiency thereof in the soil is a common cause of poor plant growth. Liquid fertilizers, as clear liquids or suspensions containing nitrogen, phosphorus, and potassium primary plant nutrients, are advantageously used as vehicles for applying manganese to soil to remedy manganese deficiencies.

While many organic or inorganic manganese salts are watersoluble, they are unsuitable for use in aqueous N-P-K liquid fertilizers because of the formation of insoluble manganese ammonium phosphates which precipitate and cause operational problems. Hence, the fertilizer industry has need for aqueous stock solutions of divalent manganese that are storage stable and compatible with liquid N-P-K fertilizers.

Current practice for alleviating manganese deficiencies is to apply an aqueous solution of manganese (manganous) sulfate ($MnSO_4$) either directly to the soil or as a foliar spray to growing plants. However, such solutions cannot be combined with aqueous liquid N-P-K fertilizers without formation of insoluble precipitates. Accordingly, the solutions must be applied as a separate field operation.

SUMMARY OF THE INVENTION

It has been discovered that an aqueous ammoniacal solution of (A) a divalent manganese-affording compound, (B) citric acid, and (C) an oxidation inhibitor containing at least equimolar proportions of divalent manganese metal and citric acid and an amount of ammonia sufficient to provide a pH in the range of about 9 to about 12 is storage stable and compatible with aqueous liquid N-P-K fertilizers. Stock concentrates containing from about 3 to about 8, preferably 5, weight percent manganese are provided by this invention. Since divalent manganese is highly susceptible to oxidation to higher valency and insoluble manganese at the solution pH necessary to form stable concentrates in accordance with this invention, it is essential that an oxidation inhibitor that is soluble in the solution be incorporated therein. Illustrative of compounds that are suitable for use as oxidation inhibitors are sulfites, bisulfites, dithionites, thiosulfates, and hydroxylamines in amounts of from about 0.01 to about 5, preferably 1, weight percent. The preferred oxidation inhibitor for this invention is sodium bisulfite.

Divalent manganese-affording compounds suitable for use in forming the compositions of this invention are water-soluble manganous sulfates, nitrates or chlorides or water-insoluble manganous compounds, such as manganous oxide (MnO), that are solubilized by combining with citric acid and aqueous ammonia in the specified pH range. A particularly suitable source of divalent manganese is a commercial product containing about 70 to 80 weight percent manganese sulfate ($MnSO_4$) in combination with ammonium sulfate and magnesium sulfate, and sold under the trade name "Carus Mn 28."

It is only essential that the solution contain an equimolar proportion of citric acid and divalent manganese metal so as to have storage stability and compatability with liquid fertilizers. Preferably, the amount of citric acid is a 10 percent molar excess so as to assure complete solubility of manganese metal and any other metals that may be introduced into the product when an impure source of manganese is used.

The storage stability and liquid fertilizer compatibility of the manganese compositions of this invention are achieved when the compositions have a pH of at least about 9. The solution pH is preferably 9.5 to 12, and more preferably 9.5 to 9.8. At a pH of less than about 9, the initial stock solution may be clear and may be immediately incorporated in a liquid fertilizer without any adverse reaction; however, after 24 hours such stock solutions contain precipitates and are unusable for intended purpose.

The manganese compositions of this invention are readily formed by adding the desired amount of divalent manganese material to an aqueous ammoniacal solution of citric acid and oxidation inhibitor at a temperature of about 60° to 100°F and thereafter, if necessary, adjusting the pH of the composition. it is to be understood that equivalent amounts of mono- and diammonium citrates may be used as the source of citric acid in the preparation of the compositions of this invention.

The term "aqueous N-P-K liquid fertilizers" as used herein refers to the usual liquid aqueous fertilizers, clear or suspensions, containing varying amounts of nitrogen, phosphorus, and potassium.

The solution containing about 3 to 8 weight percent manganese formed in accordance with this invention are especially useful as additive concentrates for incorporating soluble and compatible manganese in the various grades of mixed N-P-K clear liquid and suspension fertilizers. Field blending of such stock solutions with the usual liquid fertilizers to obtain therein the desired amounts of manganese at the time of application is satisfactorily obtained. Thus, special techniques heretofore required for incorporating manganese in liquid fertilizers are avoided.

DESCRIPTION OF THE PREFERRED EMBODIMENTS

In the following examples, all parts and percentages are by weight unless otherwise indicated; and the ammonium hydroxide used contained 28 percent ammonia.

EXAMPLE I

A 5 percent manganese solution having a pH of 4.9 was formed by dissolving 6.5 parts manganous oxide (MnO) in a solution at 75°F containing 17.5 parts citric acid, 5.35 parts ammonium hydroxide, 1 part sodium bisulfite and 69.6 parts water. The initial solution was clear. The immediate addition of 2 parts of the solution to 100 parts of (7-23-5 grade N-P-K liquid fertilizer to give 0.1 percent manganese therein did not form any precipitate. After 24 hours insoluble precipitates formed in the 5 percent manganese solution.

EXAMPLE II

A 5 percent manganese solution having a pH of 717 was formed by dissolving 6.5 parts MnO in a solution, at 75°F, of 17.5 parts citric acid, 10.7 parts ammonium hydroxide, 1 part sodium bisulfite, and 64.2 parts water. This solution was immediately clear and no precipitates formed when added to a 7-23-5 grade liquid N-P-K fertilizer. However, after 24 hours insoluble precipitates formed in the concentrate.

EXAMPLE III

A storage stable and liquid fertilizer compatible 5 percent manganese concentrate, having a pH of 9.3, was formed by dissolving 6.5 parts MnO in a solution, at 75°F, of 17.5 parts citric acid, 1 part sodium bisulfite, 13.3 parts ammonium hydroxide and 61.7 parts water.

EXAMPLE IV

A storage stable and liquid fertilizer compatible 5 percent manganese concentrate, having a pH of 9.9, was formed by dissolving 6.5 parts MnO in a solution, at 75°F, of 17.5 parts citric acid, 1 part sodium bisulfite, 16.1 parts ammonium hydroxide and 58.9 parts water.

In the above Examples I-IV, the ratio of citric acid to manganese metal was equimolar.

EXAMPLE V

In this example, "Carus Mn 28" was used as the source of manganese. Since the "Carus Mn 28" product contains small amounts of magnesium and iron, a molar ratio of citric acid to divalent manganese metal of 1.1 was used; that is, a 1.1 mols of citric acid per mol of manganese metal.

A storage stable and liquid fertilizer compatible 5 percent manganese stock concentrate having a pH of about 9.7 at 75°F was formed from 17.9 parts "Carus Mn 28 28", 19.2 parts anhydrous citric acid, 1.0 part sodium bisulfite, 9.5 parts anhydrous ammonia and 52.4 parts water. The concentrate was formed by dissolving the citric acid in the water and adding thereto the anhydrous ammonia, with cooling. The ammoniacal citrate solution was cooled to 75°F and the sodium bisulfite dissolved therein. Thereafter, the "Carus Mn 28" powder was slowly added and dissolved in the ammoniacal solution with a temperature rise of about 25°F, thereby forming the concentrate.

After an extended storage at room temperature, no insoluble precipitates formed in the concentrate, whereas in a similar concentrate that did not contain sodium bisulfite, insoluble manganese oxides formed at the air/liquid interface in the storage containers.

No incompatibility was observed when the oxidation-inhibited manganese concentrate was added to 2-6-12, 3-10-8, 7-23-5 and 10-34-0 grade N-P-K liquid fertilizers to provide 0.05, 0.1 and 0.2 percent manganese in the fertilizer.

It will be apparent to one skilled in the fertilizer art that the present invention provides a simple and effective means for forming stable manganese solutions that can be used as liquid concentrates to furnish liquid manganese in mixed N-P-K liquid fertilizers.

I claim:

1. An aqueous ammoniacal divalent manganese plant nutrient solution, said solution containing from about 3 to about 8 weight percent soluble divalent manganese metal and having a pH of from about 9 to about 12, said solutin consisting of (A) an amount of a divalent manganese-affording compound soluble in said solution sufficient to provide said amount of manganese metal, (B) at least one mol of citric acid anion per mol of divalent manganese metal, (C) from about 0.01 to about 5 weight percent sodium bisulfite, (D) an amount of ammonia sufficient to provide said solution pH, and (E) water.

2. The solution of claim 1 wherein (A) is manganous oxide.

3. The solution of claim 1 wherein (A) is manganous sulfate.

4. The solution of claim 1 wherein said solution contains about 5 weight percent manganese metal and the pH is about 9.7, (A) is manganous sulfate, and (C) is about one weight percent.

5. The solution of claim 1 wherein said solution contains about 5 weight percent manganese metal, (A) is manganous oxide, and (C) is about one weight percent.

* * * * *

UNITED STATES PATENT OFFICE
CERTIFICATE OF CORRECTION

PATENT NO. : 3,869,272
DATED : March 4, 1975
INVENTOR(S) : Richard J. Windgassen It is certified that error appears in the above-identified patent and that said Letters Patent are hereby corrected as shown below:

Col. 2, line 26, for "it" read --It--;

line 34, for "solution" read --solutions--;

line 61, delete "(";

line 67, for "717" read --7.7--.

Col. 3, line 36, delete "28" (second occurrence).

Signed and sealed this 6th day of May 1975.

(SEAL)
Attest:

RUTH C. MASON
Attesting Officer

C. MARSHALL DANN
Commissioner of Patents
and Trademarks